Dec. 18, 1934.  D. D. PEEBLES  1,984,381
METHOD AND APPARATUS FOR TREATMENT OF NONGASEOUS MATERIALS
Filed March 29, 1932  9 Sheets-Sheet 9

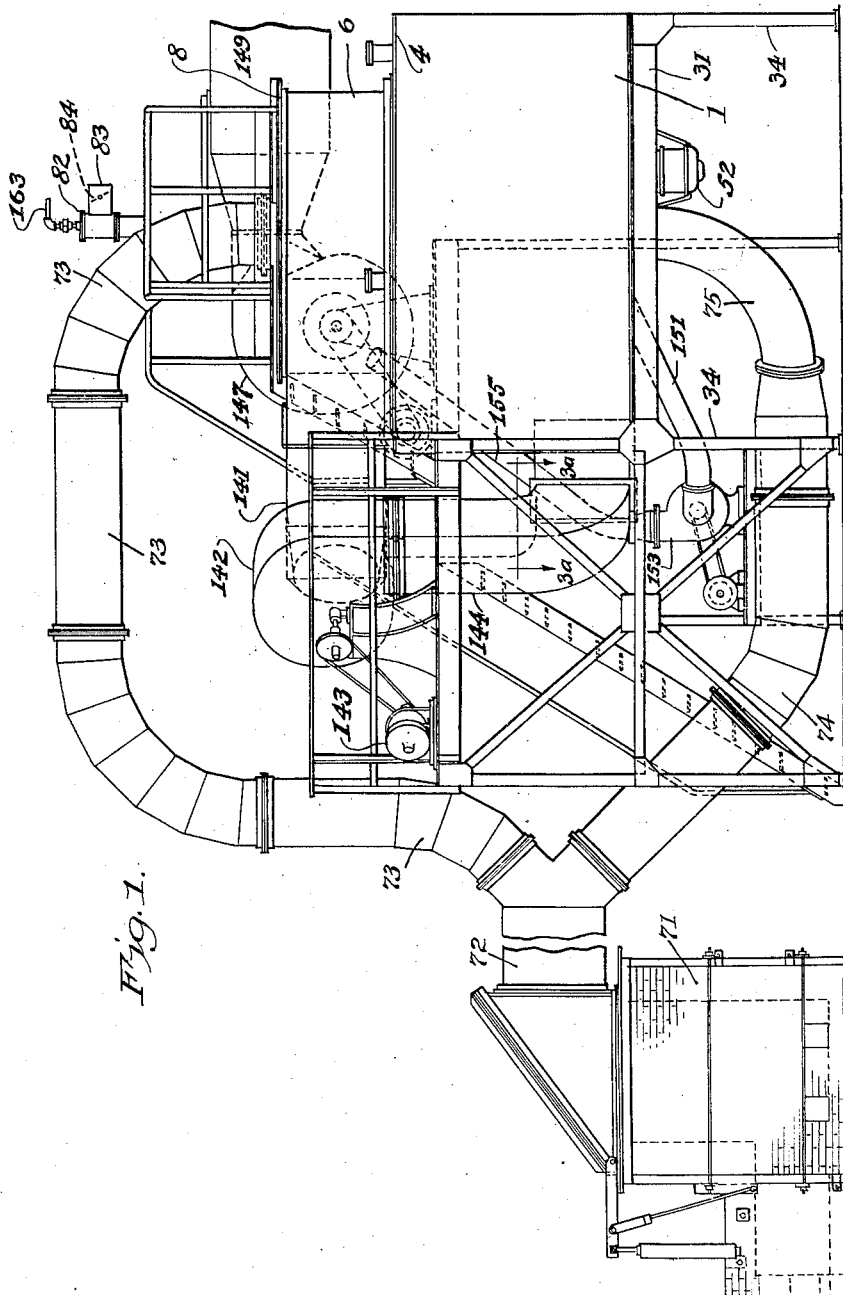

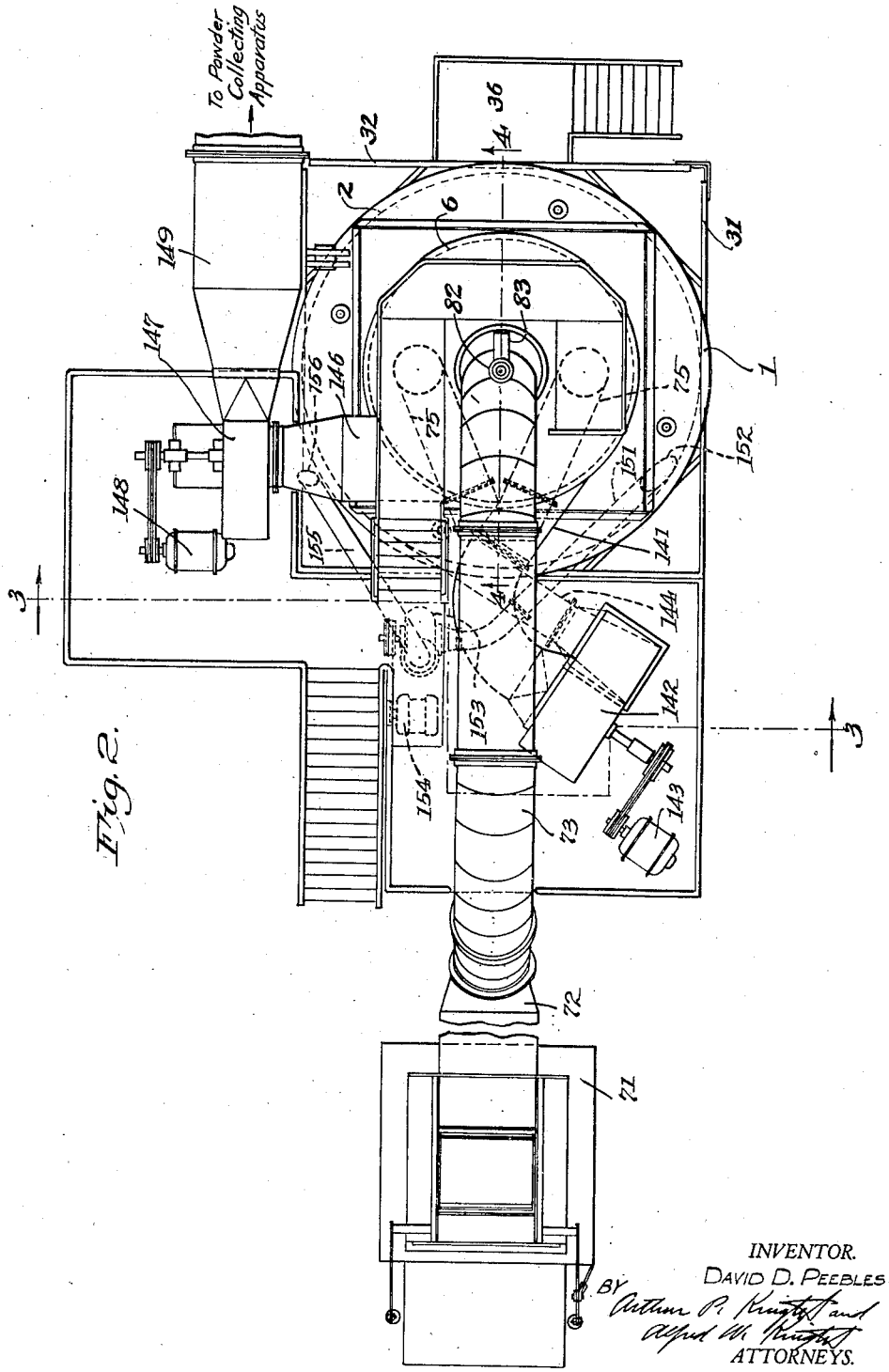

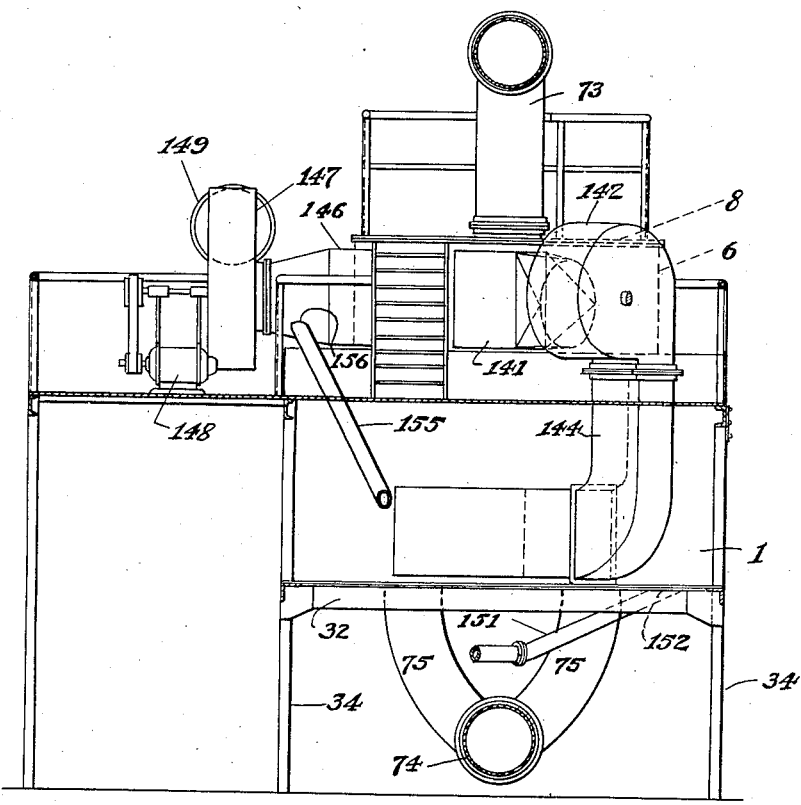
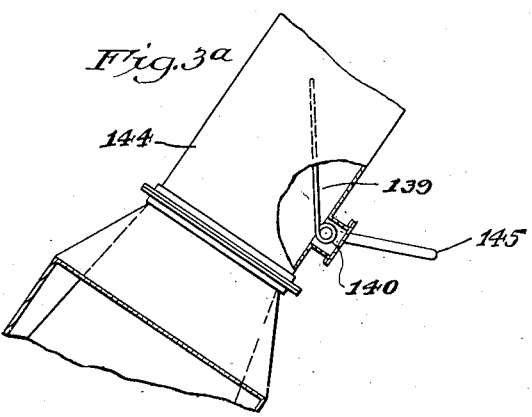

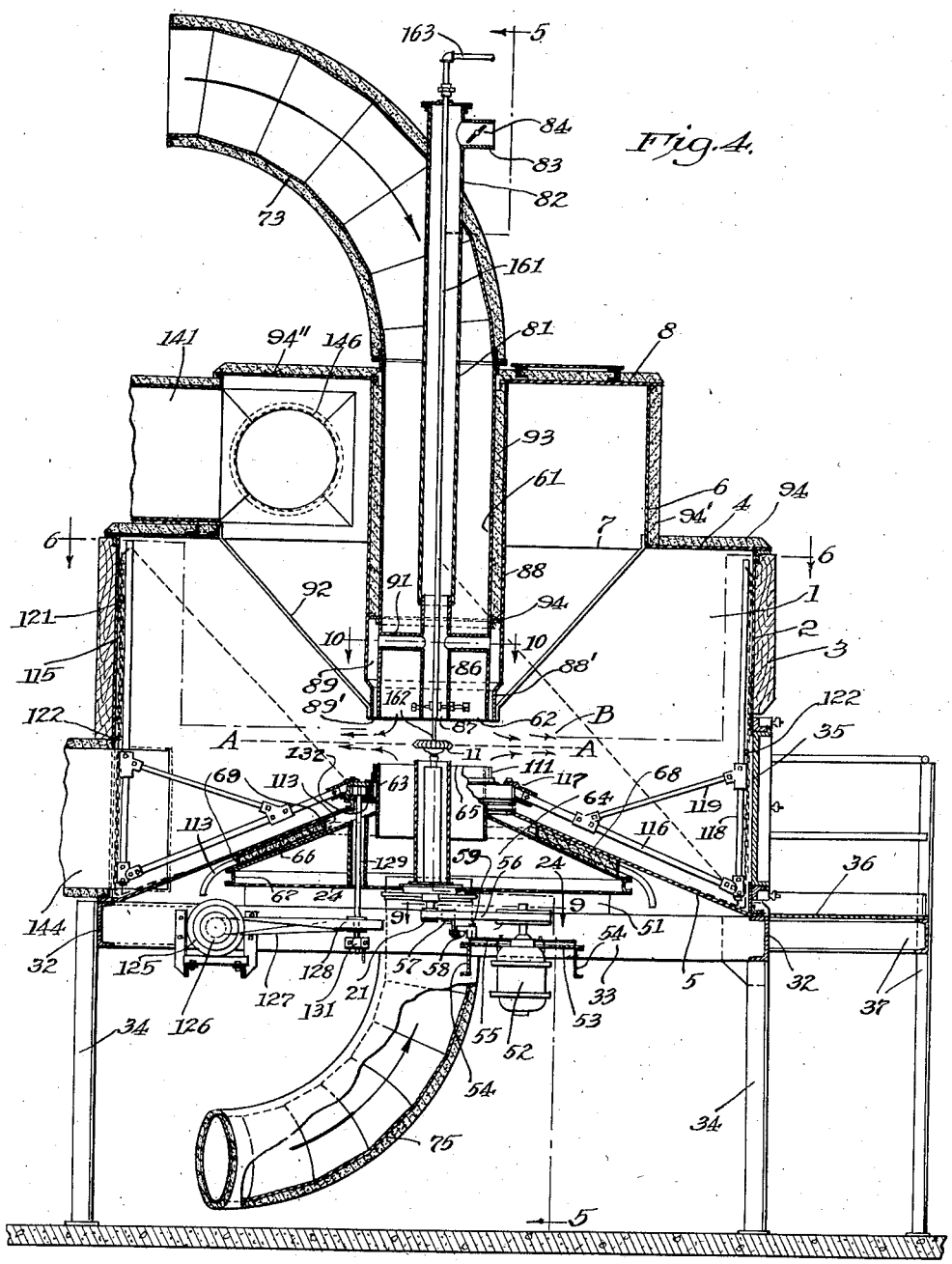

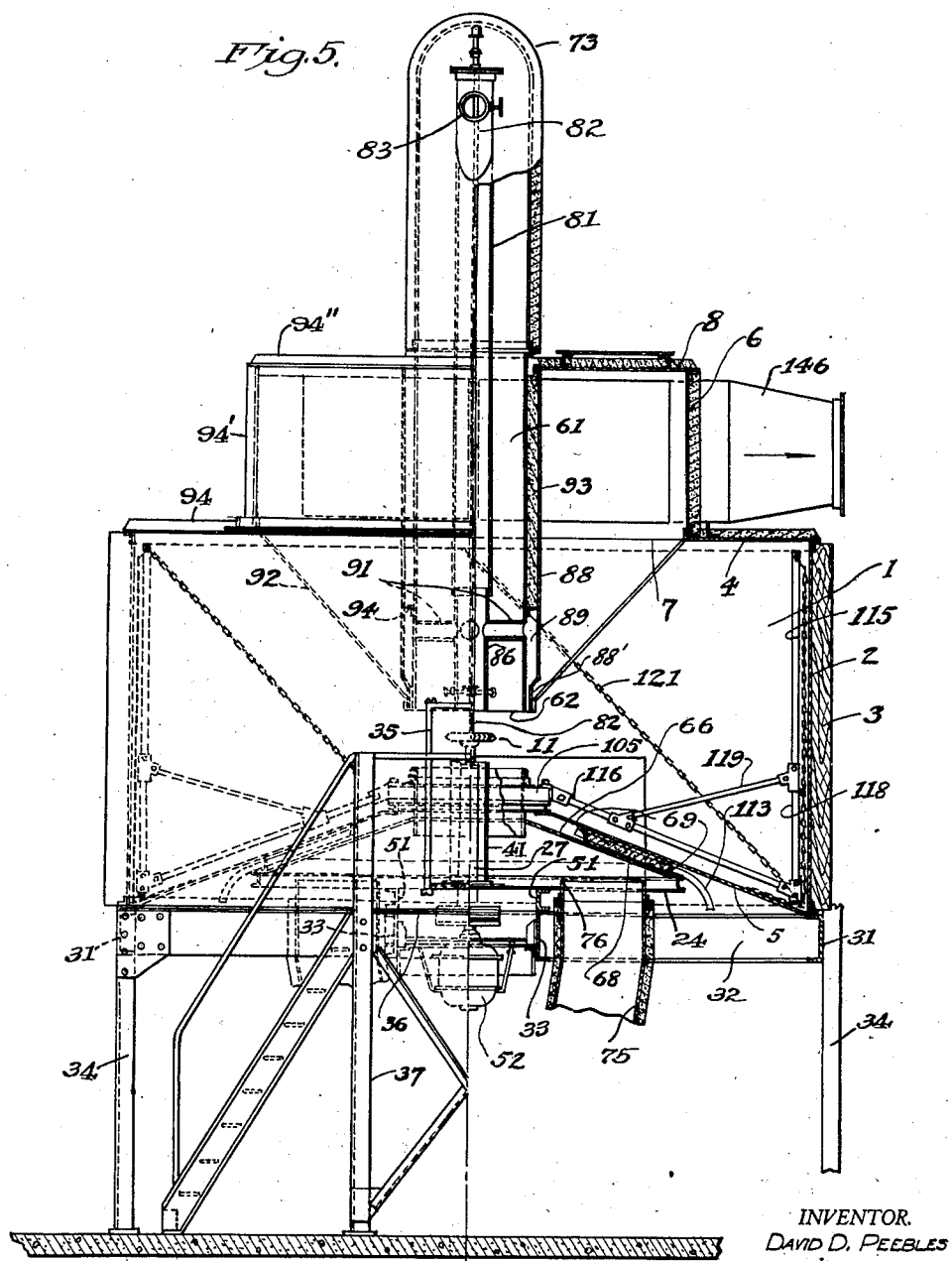

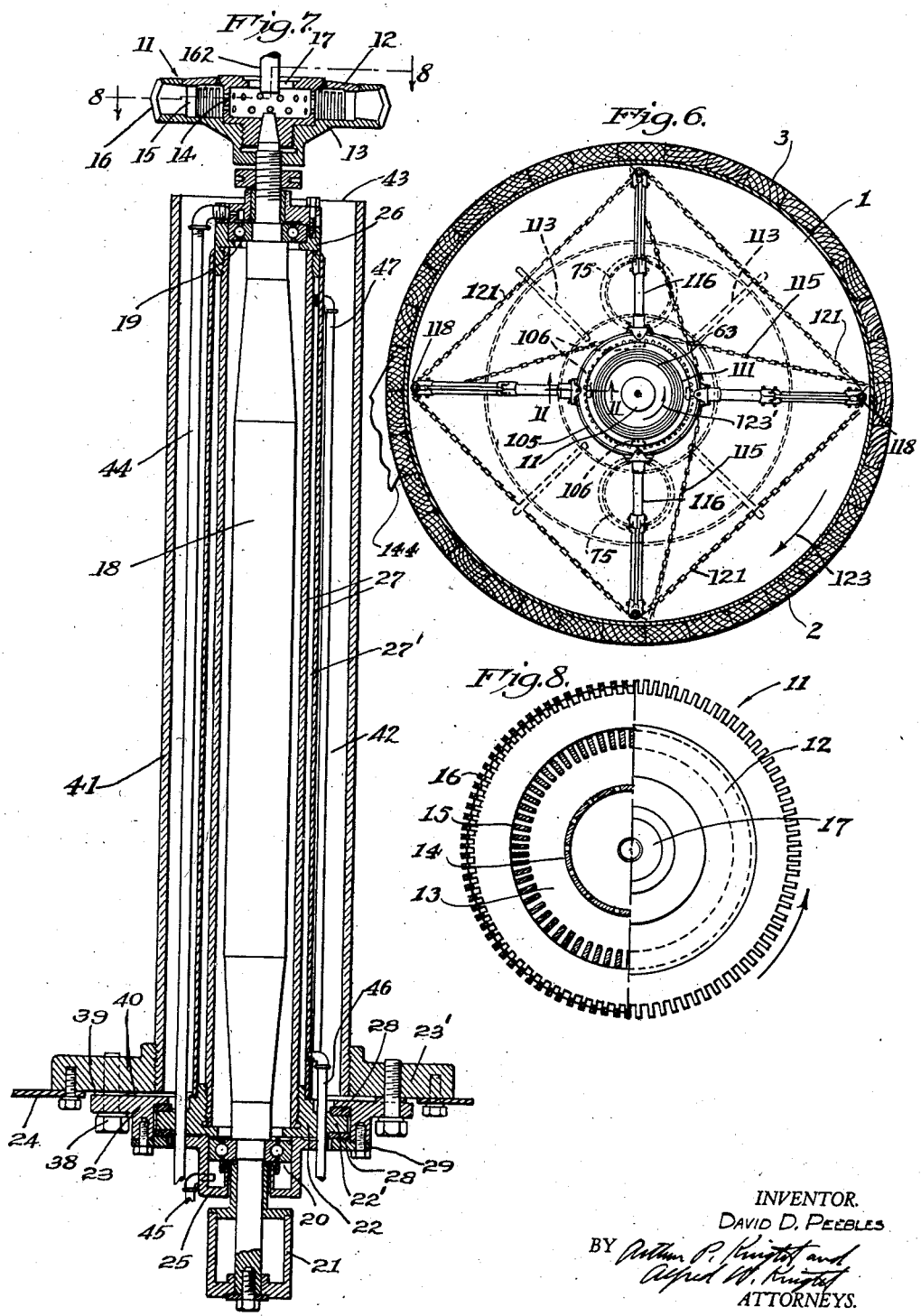

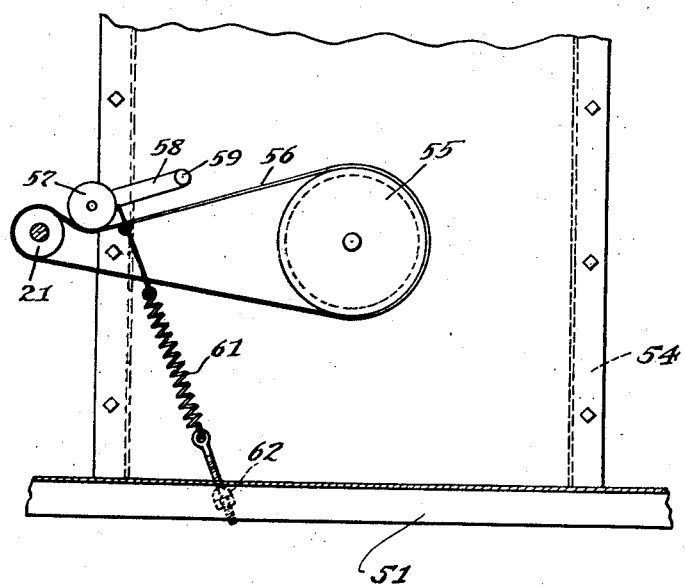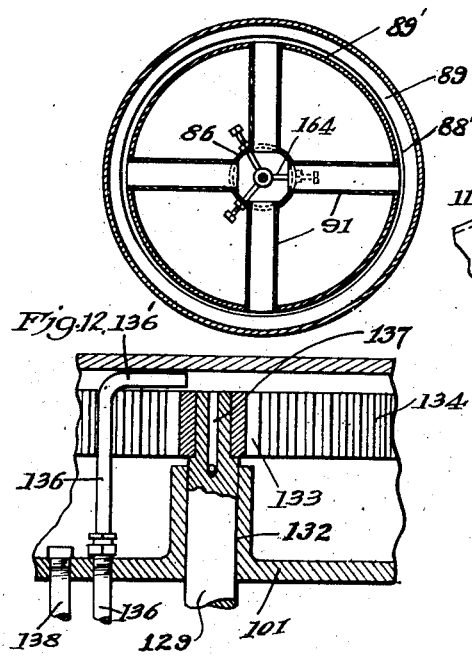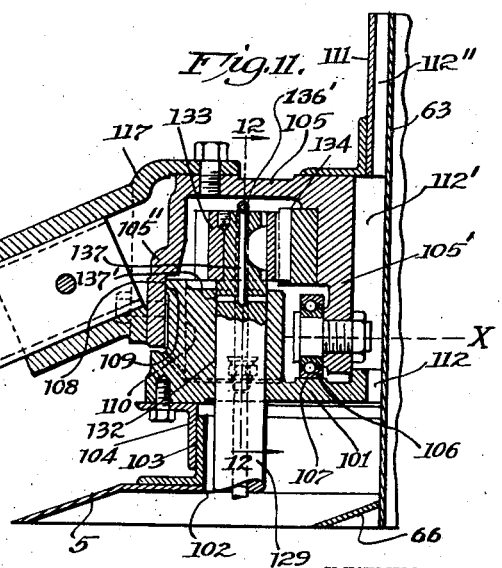

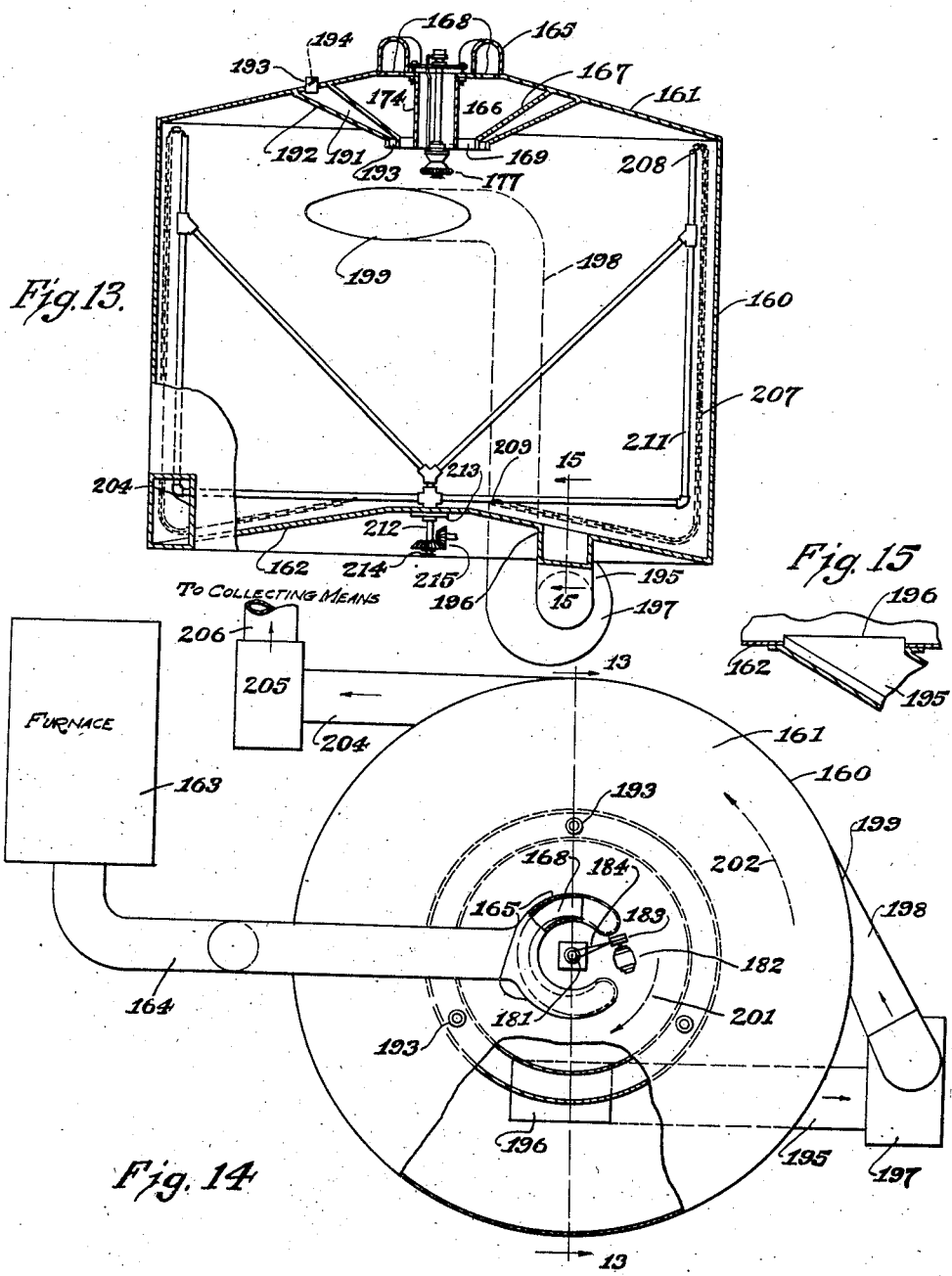

INVENTOR.
DAVID D. PEEBLES
BY *Arthur P. Knight and*
*Alfred W. Knight*
ATTORNEYS Patented Dec. 18, 1934

1,984,381

UNITED STATES PATENT OFFICE 1,984,381

METHOD AND APPARATUS FOR TREATMENT OF NONGASEOUS MATERIALS

David D. Peebles, Eureka, Calif.

Application March 29, 1932, Serial No. 601,809

23 Claims. (Cl. 159—4)

This invention relates to the treatment of non-gaseous material in suspension in a gaseous medium by methods involving, in general, the introduction of the non-gaseous material in finely divided form into contact with a gaseous medium in a treatment chamber, the maintenance of such material in suspension in and in contact with such gaseous medium in said treatment chamber for a sufficient period of time to effect the desired treatment of said material, and the subsequent removal of the treated material in suspension in a portion of said gaseous medium and separation of said treated material from said portion of gaseous medium.

The invention is intended particularly for the treatment of liquid materials, the term "liquid" being used to denote any material consisting wholly of liquid or consisting of a mixture of liquid material with solid material in solution or suspension therein and containing sufficient liquid to permit such material to be handled as a liquid for the purpose of introduction thereof in divided condition into the gaseous medium. For example, a particularly useful application of the invention is for the desiccation or dehydration of liquid materials containing solids in solution or suspension therein, for which purpose such material is introduced into a gaseous medium of sufficient temperature to cause evaporation of water or other liquid from the material and formation of a dried or partially dried solid product in powdered condition, as in the drying of milk or milk products, waste liquors in pulp and paper mills, blood, yeast-containing residues resulting from the manufacture of alcohol, or chemical solutions of various kinds. It will be understood, however, that the essential features of the present invention may also be utilized to good advantage for the treatment of liquid materials for other purposes, for example, for the concentration or distillation thereof or for bringing about chemical reaction between such liquid material or constituents thereof and a gaseous medium, and that the invention may also be used for the treatment of solid material in finely divided condition, for various purposes, for example, for removing liquid or gaseous materials, absorbed or adsorbed thereon, or for effecting chemical reaction between such solid material and a gaseous medium.

In any of the processes above referred to, it is advantageous to maintain the non-gaseous material in as nearly as possible a uniform, finely divided condition, in suspension in the gaseous treatment medium and to effect the most intimate possible contact between the material being treated and the treatment medium, to properly and uniformly control the time of such contact, to prevent or minimize deposition within the treatment chamber of non-gaseous treated material or material being treated, and to minimize the requirement for power expenditure for carrying out the treatment, and the principal object of this invention is to provide a method and apparatus in which all of the above advantages may be realized to the fullest possible extent.

This invention may be considered as an improvement on the methods and apparatus described in my United States Patent No. 1,830,174, issued November 3, 1931, and in my patent applications, Ser. No. 293,198 filed July 16, 1928 now Patent No. 1,914,895, and Ser. No. 543,315 filed June 10, 1931. In said patent and patent applications I have disclosed a novel method and apparatus of the general type above described, in which a plurality of nested or concentrically disposed treatment zones of gaseous medium are maintained within a treatment chamber, while the material to be treated is introduced into the innermost or central zone and is caused to pass progressively through said zones and to be maintained in the outermost zone and recirculated therein until the desired treatment is completed, after which the material is removed from the apparatus along with a portion of the gas from said outermost zone. The gas and suspended non-gaseous material in the outermost zone are described in said patent applications as being continually maintained in whirling or vortical motion, preferably by continually withdrawing, from said outermost zone adjacent the periphery thereof, a portion of the gaseous medium carrying non-gaseous material in suspension therein, and reintroducing said gaseous medium and suspended non-gaseous material into said zone, adjacent the periphery in a tangential or substantially tangential direction, the quantity of gas thus removed and reintroduced, and the velocity of introduction thereof being such as to maintain the desired velocity of whirling movement in said outer zone.

An important advantage of this method of treatment is that the non-gaseous material may be subjected to treatment by the gaseous medium in the innermost zone for only a limited period of time and is thereafter removed from said innermost zone and treated for a further period of time by contact with the gaseous medium in the outer zone or zones. This is particularly advantageous in the desiccation or dehydration of liquid materials and especially of such materials as are susceptible to injury by prolonged high temperature or by prolonged contact with a gaseous medium at high temperature, such as milk and other organic materials. In the treatment of such materials the gaseous medium in the innermost zone is at relatively high temperature so as to rapidly heat the particles of liquid material introduced thereto and to cause partial evaporation of liquid therefrom, but the liquid material is caused to pass quickly through said innermost zone due to the centrifugal force acting thereon as well as to the initial outward momentum thereof, thus avoiding injury thereto even at such relatively high temperature (the lack of injury to the material being due in part to the short time of contact, in part to the fact that the material then contains sufficient liquid to prevent burning, and in part to the fact that the particles are kept cool by evaporation of liquid therefrom), and the particles then pass into the outer zone or zones in which the gaseous medium is at sufficiently low temperature and also of sufficiently high vapor content to prevent injury to the suspended material even after complete removal of liquid therefrom, and such particles are maintained in contact with such gaseous medium in the outer zone or zones for only sufficient time to complete the desired desiccation or dehydration thereof without injury to such materials at the temperature of such outer zone or zones, whereafter the material is removed from the treatment chamber and separated from the gaseous medium.

An important factor in the above-described process is the thickness of the outer zone or zones of gaseous medium and the velocity of whirling movement thereof and also the relation between the time of contact of the particles of liquid material with the gaseous medium in the respective zones, and particularly the uniformity of such relation for all of the introduced liquid material.

An important object of the present invention, therefore, is to maintain a uniform and controllable relation between the movement of the suspended particles of liquid material and the movement of the gaseous medium in the inner and outer zones, and particularly to maintain an outer zone of substantially predetermined radial thickness with relation to the total diameter of the treatment chamber and to insure that all of the introduced liquid material, after a substantially uniform time of exposure to contact with the gaseous medium in the inner zone, will pass into this outer zone and be repeatedly recirculated therein for the desired length of time to complete the treatment.

A further object of this invention is to maintain whirling movement of a relatively large body of gas in an outer zone of substantially predetermined thickness, at sufficient velocity to maintain the material being treated in suspension, with a minimum expenditure of power, which object I accomplish in general by removing from said outer zone, at a position somewhat inward of the periphery of the chamber, a quantity of gas which is relatively small in proportion to the total quantity of gas circulating in said zone, and imparting to the quantity of gas so removed a relatively high increment of velocity and reintroducing such gas at the resulting high velocity into said outer zone. The energy of this relatively small quantity of gas introduced at this high velocity serves to overcome the loss of energy due to friction of the whirling gas against the walls of the treatment chamber and to set the entire body of gas in the outer zone in rapid vortical or whirling motion and maintain such motion, and such energy may be supplied by means of a recirculating fan whose size and power requirements are much less than would be required if the entire quantity of recirculating gas in the outer zone were to be removed from the treatment chamber and reintroduced thereto during each revolution.

The removal of the gas so recirculated at a position inward of the periphery serves to substantially definitely locate the inner edge of the outer whirling zone, and thus permits an outer zone of the desired thickness to be maintained by the circulation of a relatively small quantity of gas.

A further object of the invention is to provide a novel and improved relation between the introduction of the material to be treated, and of the gaseous treating medium, into the innermost zone, resulting in the highest possible uniformity of contact of such liquid material with said gaseous medium and the minimum loss of energy due to irregular conditions of gas flow. According to the preferred embodiment of this invention, the material to be treated is delivered with an outward component of motion from adjacent the axis of the treatment chamber, in a circular zone or layer, as for example by means of a centrifugal atomizer rotating at high velocity about said axis, and the gaseous medium is introduced with a substantially axial component of motion, at both sides of said circular layer or zone of introduced material and is caused to effectively impinge upon, mingle with and contact such material and to spread transversely of the axis of the treatment chamber and pass in a generally outward direction, along with the material being treated, into the outer zone or zones. A further advantage of the above arrangement is that the rotative force of the centrifugal atomizer and the rotary component of motion of the atomizer particles of material thrown outwardly therefrom is utilized to impart rotary motion to the gaseous medium thus introduced into contact therewith, and cause such gaseous medium to whirl around with the material being treated, without requiring the provision of any additional means, such as inclined vanes or louvers, for effecting tangential introduction of such gaseous medium, such as has heretofore ordinarily been provided.

It may be pointed out at this point that, while reference is made herein to a gaseous medium in an inner zone and to a gaseous medium in an outer zone, the gaseous medium is, according to the preferred embodiment of this invention, one and the same medium in both of these zones, except as it may be altered within the treatment chamber. Said gaseous medium will generally possess a different temperature or other property or properties in the respective zones and may also be changed in composition, the gaseous medium being in general introduced into the innermost zone and passing progressively into and through the respective zones, and the properties and composition thereof being progressively altered by contact with the material being treated. For example, in the preferred application of this invention to the desiccation or dehydration of liquid materials, the gaseous medium is introduced at relatively high temperature into the inner zone and passes thence, with the material being treated, into the outer zone and becomes a part of the gaseous medium circulating in said outer zone, but, by the time said gaseous medium reaches said outer zone, its temperature is materially reduced due to utilization of heat in raising the temperature of the liquid material and evaporating liquid therefrom, and its vapor content is also materially increased, so that said gaseous medium is at that time much less apt to damage heat-sensitive constituents of the material being treated.

Further objects of the invention are to provide improved means for preventing accumulation on the walls of the treating chamber of non-gaseous material tending to deposit thereon, and for removing such material from the chamber, and to provide novel and advantageous means for introducing cooling gas at certain positions adjacent the positions of introduction of the hot gaseous drying medium, so as to prevent overheating of certain surfaces by contact of such hot gaseous medium therewith and to also prevent contact of suspended non-gaseous material with certain heated surfaces, as hereinafter described.

The accompanying drawings illustrate forms of apparatus embodying my invention and referring thereto:

Fig. 1 is a side elevation of a desiccating apparatus in accordance with this invention including means for producing a hot gaseous drying medium and supplying the same to the desiccating chamber.

Fig. 2 is a plan view of the apparatus shown in Fig. 1.

Fig. 3 is a vertical section on line 3—3 in Fig. 2, showing the desiccator in side elevation.

Fig. 3a is a section on line 3a—3a in Fig. 1.

Fig. 4 is a vertical section of the desiccating apparatus on line 4—4 in Fig. 2.

Fig. 5 is a view of the desiccating apparatus, the left half being in elevation and the right half in section on line 5—5 in Fig. 4.

Fig. 6 is a horizontal section on line 6—6 in Fig. 4.

Fig. 7 is a vertical section of the centrifugal atomizer and the drive spindle therefor.

Fig. 8 is a partly sectional plan view of the centrifugal atomizer, on line 8—8 in Fig. 7.

Fig. 9 is a plan view of a part of the driving means for the centrifugal atomizer on line 9—9 in Fig. 4.

Fig. 10 is an enlarged horizontal section on line 10—10 in Fig. 4.

Fig. 11 is an enlarged vertical section on line 11—11 in Fig. 6.

Fig. 12 is a vertical section on line 12—12 in Fig. 11.

Fig. 13 is a vertical section of a modified form of desiccating apparatus embodying certain features of my present invention.

Fig. 14 is a plan view, partly broken away, of the form of desiccating apparatus shown in Fig. 14, also showing means for supplying hot gaseous drying medium thereto.

Fig. 15 is a section on line 15—15 in Fig. 13.

Figure 16:
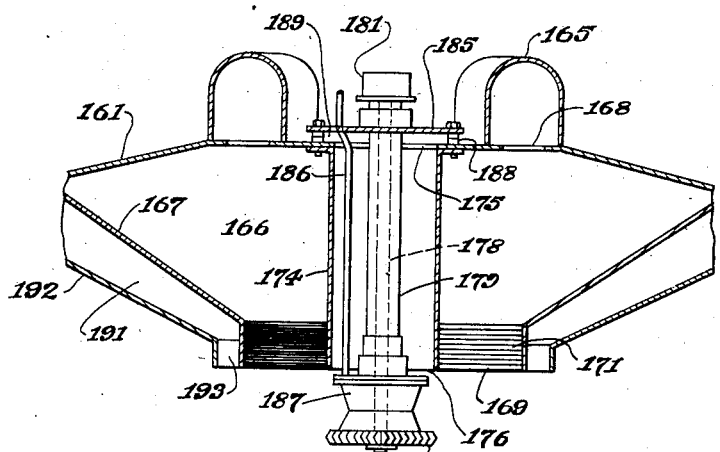
Fig. 16 is a sectional view on a somewhat larger scale, showing the centrifugal atomizer and adjacent gas inlet means, of the form of apparatus shown in Fig. 13.

In the form of apparatus shown in Figs. 1 to 12 inclusive, the treating chamber is shown at 1. Said chamber, whose construction is shown particularly in Figs. 4, 5 and 6, is of substantially circular horizontal cross section and is shown as a cylindrical chamber having a substantially vertical axis, and provided with a cylindrical side wall consisting, for example, of a metal shell 2 reinforced exteriorly with upright wooden strips or lagging 3, and also provided with a top wall 4 and bottom wall 5. The top wall 4 is shown as being substantially horizontal while the bottom wall 5 is shown as frusto-conical in shape. Said chamber is also provided with a cylindrical gas outlet chamber 6 disposed above the top wall 4 and communicating with the interior of the main treatment chamber through an opening 7 in said top wall, said opening preferably being substantially equal in diameter to said outlet chamber, and said outlet chamber being provided with a top wall 8. The treatment chamber and outlet chamber may be of any suitable dimensions, but I prefer to construct the treatment chamber with a diameter somewhat greater than the height thereof from the lowest point of the bottom wall 5 to the top wall 4, and to make the diameter of the outlet chamber 6 considerably less than the diameter of the treatment chamber 1, for example, from one-half to three-fourths as great.

The above described desiccating chamber is shown as mounted upon a supporting frame comprising horizontal front and rear frame members 31, horizontal side frame members 32, and horizontal intermediate frame members 33 secured at their ends to the side frame members 32, all of said horizontal frame members 31, 32 and 33 being supported by vertical frame members 34. The desiccating chamber is also shown as provided with a removably mounted access door 35 adjacent the bottom of the side wall 2 at one side of the chamber for permitting access to the interior of said chamber for inspection, cleaning and repairing purposes. Access to said door may be provided by means of a platform 36 mounted on a supporting structure 37 as shown in Figs. 2, 4 and 5, said platform being omitted from Fig. 1 because of lack of space.

The centrifugal atomizing device 11 is disposed substantially centrally of the treatment chamber and preferably at approximately the mid-height of said treatment chamber, and is mounted for rotation at high speed about the vertical axis of said chamber. Said atomizing device, as shown particularly in Figs. 7 and 8, may comprise an atomizer head formed by two spaced horizontal discs 12 and 13 and three concentric apertured walls 14, 15 and 16 extending between said discs. The space within the innermost wall 14 constitutes a chamber into which liquid material to be atomized may be delivered through a central opening 17 in the upper disc 12, so that upon rotation of said atomizer head at high velocity, such material is caused to pass by centrifugal force, successively through the apertured walls 14, 15 and 16, and to be delivered from the periphery thereof in atomized or extremely finely divided condition, in the form of an outwardly moving whirling layer adjacent a horizontal plane at the mid-height of the atomizer head, as indicated at A—A. Such an atomizing device is described in detail and claimed in the co-pending application of David D. Peebles and Arthur E. Barlow, Ser. No. 527,730, filed April 4, 1931. This specific form of atomizing device is not essential to the present invention but is shown herein by way of illustration only, and it will be understood that any other suitable form of centrifugal atomizing device may be substituted therefor.

The atomizer head 11 is shown as secured to the upper end of a driving spindle 18, which is rotatably mounted in upper and lower bearing means 19 and 20 respectively. The lower end of said spindle is provided with a driving pulley 21. The supporting means for the driving spindle is shown as comprising a supporting member 22 mounted upon an annular ring 23 which is in turn secured to an annular supporting ring 23' mounted on and supported by an auxiliary bottom plate 24, a lower bearing support 25 secured to said supporting member 22 and an upper bearing support 26 secured to said supporting member 22 by means of a double walled tubular support 27. The supporting member 22 is preferably mounted on ring 23 by means of a flange 22' held between resilient cushioning supports 28 formed of rubber or other suitable material by clamping collar 29 secured to said ring 23. The ring 23 is shown as secured to ring 23' by means of bolts or cap screws 38 which extend through spacing lugs 39 on said ring 23, so as to provide a restricted space 40 between said rings 23 and 23'. A tubular shield or sleeve 41 is disposed concentrically about the double walled tubular support 27, being secured at its lower end to ring 23', so as to define an annular space 42 communicating with the atmosphere at its lower end through the space 40 above mentioned and communicating through the open upper end 43 of said sleeve with the interior of the desiccating chamber directly below the atomizer 11. Lubricating oil may be supplied to the upper bearing 19 by means of oil feed pipe 44, and excess oil may be drained from beneath the lower bearing 22 by means of pipe 45. A suitable cooling medium, such as water, may be circulated through the space between the two walls 27' of tubular support 27 by means of pipes 46 and 47. The auxiliary bottom plate 24 above mentioned is shown as mounted upon supporting channels 51 which rest upon and are secured to the respective intermediate supporting members 33.

Any suitable form of driving means may be provided for the centrifugal atomizer, but I have shown driving means comprising an electric motor 52 mounted on a supporting platform 53 which is supported on channels 54 secured to the intermediate supporting members 33, pulley 55 mounted on the shaft of said motor, and drive belt 56 operatively connecting said pulley 55 to the driving pulley 21 at the lower end of driving spindle 18. In order to maintain proper engagement of the belt 56 with pulley 21, at the high speed of rotation under which said pulley is normally rotated, I prefer to provide an idler pulley 57 rotatably mounted on arm 58 pivoted at 59 and resiliently held in engagement with belt 56 by means of tension spring 61 secured at one end to said arm 58 and at the other end to a fixed support 62.

Means are also provided for admitting gaseous drying medium at relatively high temperature to the interior of the desiccating chamber, in a substantially axial direction, above and below the position of the centrifugal atomizer. Such means are shown as comprising an upper gas inlet pipe 61 disposed centrally of the desiccating chamber, said pipe extending through the top wall 8 of the gas outlet chamber 6 and extending downwardly to a position somewhat above the horizontal plane A—A, in which the material is delivered from the centrifugal atomizer, and being open at its lower end as shown at 62, and a lower gas inlet pipe 63 also disposed centrally of said desiccating chamber, opening at its lower end into an inlet chamber 64 and opening at its upper end 65 into the interior of the desiccating chamber at a position somewhat below the above-mentioned horizontal plane of delivery of the material to be treated. The upper and lower inlet pipes 61 and 63 are preferably of relatively small cross-sectional area as compared to the cross-sectional area of treating chamber 1, so as to deliver gaseous medium in an annular zone immediately adjacent the periphery of atomizer 11. The inlet chamber 64 is shown as inclosed between the auxiliary bottom plate 24 and a frusto-conical plate 66 secured at its upper inner end to pipe 63 and at its lower outer end to a ring-shaped member 67 which is in turn secured to said plate 24. In order to prevent overheating of the bottom wall 5 of the desiccating chamber, I prefer to space the top plate 66 of the inlet chamber 64 somewhat below said bottom wall, as shown, and the space between said plate and said bottom wall may advantageously be provided with suitable heat insulating medium indicated at 68, held in position by means of concentric annular flanges 69.

The heated gaseous drying medium may be obtained from any suitable source, depending upon the desired type of gas to be used for this purpose. In many cases, as in the desiccation of milk or milk products, hot combustion gases may be used as a drying medium, and I have shown a furnace 71 for producing a supply of such hot combustion gases. Said furnace may be of any suitable type, adapted for the combustion of either solid, liquid or gaseous fuel. The hot combustion gases from said furnace are delivered through flue 72, from which a portion of such gases pass through an upper flue 73 to the upper end of the upper inlet pipe 61, while another portion of such gases passes through lower flue 74 and branch flues 75 to the inlet chamber 64 and thence to the lower inlet pipe 63. Said branch flues 75 extend through the auxiliary bottom plate 24 as shown at 76 in Fig. 5.

Means are also provided for admitting relatively cool air or other gas at certain definite positions adjacent the hot gas inlet means, in addition to the means already described for admitting said relatively cool gas through the sleeve 41 surrounding the atomizer shaft. For this purpose, a tubular shield or sleeve 81 extends centrally within the upper inlet pipe 61. Said sleeve 81 extends at its upper end through the wall of flue 73 as shown at 82 and communicates with the atmosphere or with any other suitable source of gas at relatively low temperature, through pipe 83 preferably provided with a damper 84, and is connected at its lower end to a centrally extending shield or sleeve portion 86 which opens at its lower end 87 into the central portion of the desiccating chamber directly above the atomizer and at a position inside the annular stream of hot gas delivered through pipe 61.

A tubular shield 88 is also provided around the pipe 61 and of somewhat larger diameter, so as to provide an annular passage 89 communicating with the pipe 86 by means of one or more radial pipes 91 (shown as four in number in Fig. 10). The lower end portion 88' of tube 88 is shown as of somewhat reduced diameter, so as to provide a restricted annular passage 89' through which cool gas may be admitted to the desiccating chamber around the lower end of the upper inlet pipe 61. The lower end of tube 88 is shown as supported by means of brace members 92 whose outer ends are secured to the top wall of the desiccating chamber. The upper part of the annular space between pipe 61 and tube 88, above the level of pipes 91, is shown as filled with suitable heat insulating material 93 supported by means of flange 94 secured to pipe 61, but it will be understood that, if desired, this heat insulating material may be omitted and the pipes 91 may be disposed adjacent the upper end of the tube 88, so as to provide for inflow of cool gas throughout the entire height of the space between said tube and pipe 61. Additional heat insulating material may also be provided at any desired points, such as indicated for example at 94, 94' and 94''.

Referring particularly to Figs. 11 and 12, in conjunction with Figs. 4 to 6 inclusive, an annular bearing ring 101 is shown as disposed around the lower gas inlet pipe 63 and supported upon the bottom plate 5 in position over a central opening 102 in said bottom plate, by means of supporting members 103 and 104. A carriage ring 105 is rotatably mounted upon said bearing ring, for example by means of a plurality of ball bearing rollers 106 (shown as four in number in Fig. 6) rotatably secured at suitable intervals to a dependent inner flange 105' on said carriage ring, so as to permit rotation of said rollers about horizontal radial axes as indicated at X in Fig. 11, said rollers running upon an annular horizontal bearing face 107 on bearing ring 101. Carriage ring 105 is also provided with a depending outer flange 105'' which is provided with a cylindrical bearing face 108 engaging a cylindrical bearing face 109 on an upwardly extending flange 110 of bearing ring 101, so as to maintain the carriage ring 105 properly centered during rotation thereof. A short tubular shield 111 is secured to carriage ring 105 and extends upwardly therefrom to substantially the height of the upper end 65 of pipe 63. Bearing ring 101, carriage ring 105 including flanges 105' and 105'', and tube 11, are disposed concentrically about pipe 63 and spaced somewhat therefrom so as to provide passages indicated at 112, 112' and 112'' for inflow of air or other cool gas to the interior of the desiccating chamber directly around the upper end of the lower inlet pipe 63. In the present construction I have shown means for supplying atmospheric air to said passages. For this purpose, air inlet pipes 113 are provided, extending radially in the space between bottom wall 5 and the top plate 66 of inlet chamber 64 and through the heat insulation means 68 above mentioned, there being any suitable number of said pipes 113 disposed at suitable angular positions about the axis of the desiccating chamber. For example, in Fig. 6 I have shown four such pipes.

The purpose of carriage ring 105 is to serve as a support for suitable cleaning means adapted to be rotated in engagement with the side and bottom walls of the desiccating chamber to prevent accumulation thereon of any desiccated or partially desiccated material which may be deposited during operation of the apparatus. Such cleaning means are shown as comprising chains or other flexible flailing elements 115. In order to support said chains in the proper positions, a rotatable supporting structure is provided therefor, comprising rods 116 rigidly secured at 117 to carriage ring 105 and extending radially and downwardly just above the bottom wall 5 to a position adjacent the outer edge of said bottom wall, vertical rods 118 secured at their lower ends to the respective rods 116 and extending upwardly throughout substantially the entire height of the desiccating chamber and somewhat inwardly of the side wall thereof, and inclosed braces 119 connected to rods 116 intermediate the ends thereof and to the vertical rods 118 at a position above the lower ends thereof but preferably somewhat below the horizontal plane of delivery of material to be treated. The vertical rods 118 may be further supported, so as to prevent rearward inclination of the upper ends thereof with respect to the direction of rotation of the chains, by means of wires, chains or the like, indicated at 121 and connecting the lower end of each vertical rod 118 to the upper end of the next succeeding rod with respect to the direction of rotation, such direction of rotation of the cleaning means being, for example, as indicated by the arrow at 123 in Fig. 6. The chains 115 are shown as being two in number, each of said chains being connected to the upper ends of two diametrically opposed rods 118 and extending downwardly therefrom to the bottom of the side wall and desiccating chamber and thence across the bottom of the desiccating chamber, so that upon rotation of the cleaning means said chains engage, rub against or jar substantially all parts of the side and bottom walls of said chamber. It will be understood that upon rotation of the cleaning means, the chains 115 will be thrown outwardly in engagement with the side walls by the action of centrifugal force thereon and exert a sort of flailing action thereon, thus loosening and dislodging any particles which may be momentarily deposited thereon. In order to prevent undue whipping of said chains, I also prefer to support the same on the bars 118 at points intermediate the height thereof, for example, as shown at 122.

Rotation of the carriage ring 105 and the cleaning means supported thereby may be effected by means of an electric motor 125 connected by pulley 126, belt 127 and pulley 128 to the drive shaft 129 rotatably supported in the lower bearing 131 and an upper bearing 132, and is provided at its upper end with a pinion gear 133 keyed or otherwise secured thereto in any suitable manner, said pinion gear meshing with a spur gear 134 on carriage ring 105. Electric motor 125 and lower shaft bearing 131 are supported on one of the intermediate frame members 33, and upper shaft bearing 132 is formed on or secured to bearing ring 101. Lubricating oil may be supplied through feed pipe 136 extending upwardly through the bearing ring 101 and having its upper end portion 136' bent over and terminating directly above the upper end of shaft 129 and pinion gear 133. A portion of the oil delivered on the top of said pinion gear and shaft is thrown outwardly therefrom, so as to lubricate the teeth of said pinion gear and spur gear 134, and to also lubricate the bearing surfaces 108 and 109 while another portion of such oil flows through central feed passage 137 and radial passages 137' in shaft 129 to lubricate bearing 132. Excess oil collects upon the bearing ring 101 and may be removed through drain pipe 138.

Recirculation of a portion of the gaseous medium in the outer zone of the desiccating chamber is effected by means of recirculation outlet flue 141, gas propelling means such as fan or blower 142 driven by electric motor 143 and recirculation inlet flue 144. One of said flues, such as flue 144, is preferably provided with a suitable damper, such as damper 139 pivotally mounted at 140 at one side of said flue and operated by means of lever 145, so as to control the rate of recirculation of gas. The recirculation outlet flue 141 opens tangentially into the gas outlet chamber 6 at one side thereof, while the recirculation inlet flue 144 opens tangentially into one side of the desiccating chamber at the periphery thereof and preferably adjacent the bottom thereof. Said outlet and inlet flues open in opposite directions into the chamber, so as to maintain smooth swirling or vortical flow of gas in one direction in the outer zone of the desiccating chamber, for example, in a clockwise direction as shown by the arrow 123. The direction of rotation of the scraping means above described is preferably the same as the direction of whirling movement of the gas in the outer zone.

Means are also provided for continually discharging a portion of the gas and suspended material from the desiccating chamber and separating such suspended material from such discharged gas. Such means are shown as comprising a discharge outlet flue 146 also connected tangentially to the outlet chamber 6 in the same direction as the recirculation outlet flue 141, fan or blower 147 driven by electric motor 148, and flue 149 leading from said fan or blower to any suitable type of dust collecting apparatus, for example, to a cyclone dust collector or bag filter, not shown.

It is also desirable in some cases to provide means for positively and continuously removing from the bottom of the desiccating chamber any solid material which may accumulate on the bottom wall of the chamber and which does not become re-suspended in the gaseous medium under the action of the cleaning means above described. The means for this purpose may comprise a powder removing flue 151 opening through the bottom wall of the desiccating chamber, preferably adjacent the periphery thereof, as shown at 152 and extending downwardly and tangentially therefrom, fan or blower 153 driven by electric motor 154 and a flue 155 leading from said fan or blower and opening at 156 into the discharge outlet flue 146 adjacent the inlet of the discharge fan 147.

Material to be desiccated may be delivered into the atomizing apparatus through the central opening 17 in any suitable manner, for example, by means of a feed pipe 161 which preferably extends into the desiccating apparatus axially and through the upper portion thereof. Said feed pipe is shown as disposed centrally within pipe 81, extending at its lower end through the open lower end of said pipe 81 and into the interior of the atomizer head as shown at 162 and at its upper end to the closed upper end of said pipe 81, where it is connected to a supply pipe 163 through which liquid material may be delivered from any suitable source. The lower end portion of pipe 161 may be supported and maintained in axial position by means of spacing bolts 164 mounted on pipe 86 as shown in Fig. 10.

In the operation of the above-described apparatus for the purpose of desiccating liquid material, such as milk or milk products, the several fans and other operating parts above described are set in operation, hot combustion gases are produced in furnace 71 and delivered to the desiccating chamber, and the material to be desiccated is delivered through feed pipe 161 into the central portion of the centrifugal atomizer 11. Said atomizer is rotated at high velocity, for example, at a speed of from 5,000 to 15,000 revolutions per minute and preferably in a direction opposite to the direction of whirling movement of gaseous medium in the outer zone, for example, in a counter-clockwise direction as shown by the arrow at 123'. The liquid material delivered to said atomizer is therefore caused to rotate rapidly therewith and to pass, under the action of centrifugal force, through the apertured walls 14, 15 and 16, and to be thrown outwardly from the outermost of said walls in highly atomized or finely divided condition and in a substantially horizontal layer or zone adjacent the plane A—A.

The hot gaseous drying medium enters in a downward direction through the upper inlet pipe 61 and in an upward direction through the lower inlet pipe 63, and the two opposing streams of gas thus delivered impinge directly upon the top and bottom respectively of the outwardly moving whirling layer of finely divided material. The gaseous drying medium is thus brought into extremely intimate and uniform contact with all particles of the material to be treated, and the two opposing gas streams are caused to diverge and pass outwardly along with and directly above and below the finely divided material as indicated by the arrows at B in Fig. 4. The rotary component of motion of the suspended particles thrown outwardly from the centrifugal atomizer also serves by its frictional drag upon the gaseous medium, to impart whirling or vortical motion to the gaseous medium during this outward movement, and the direction of such whirling movement is opposite to the direction of whirling movement in the outer zone. As the gas and suspended material continue to move outwardly they encounter the oppositely whirling outer zone of recirculating gas and suspended material and thereupon reverse their direction of rotary movement and mingle with said outer zone.

During the above-described outward passage of the gas and suspended material in the inner zone, the high temperature of the gas serves to quickly heat the suspended particles throughout and to cause evaporation of a portion of the liquid contained therein. However, the duration of such contact is relatively short, so that before any serious injury is done to the suspended material due to such high temperature, the suspended material enters the outer zone and immediately comes in contact with a gaseous medium at a temperature sufficiently low to prevent any such injury thereto. The relatively low temperature of the gas in the outer zone as compared with the inner zone is due in part to the fact that before any of the gaseous medium introduced through the inlet pipes 61 and 63 reaches said outer zone, its temperature is materially reduced by evaporation of liquid from the suspended material and by transfer of heat from such gas to the suspended material and to the vapor evolved therefrom, and in part to the repeated recirculation of the gas in the outer zone, which provides a greatly prolonged average time of contact of the suspended material with the gas before being finally discharged from the chamber and thus provides a still further transfer of heat from the gas to the suspended material and liberated vapors and a corresponding further reduction in temperature of the gas in the outer zone. The fact that the gaseous medium in the outer zone is caused to whirl in the opposite direction to the gas and suspended material in the inner zone serves to maintain a sharper separation between the two zones than would be the case if the direction of whirling movement were the same in both zones, and also increases the time of contact of the suspended material with the gas.

The suspended material remains substantially wholly in suspension in the gaseous medium in the outer zone of the desiccating chamber and is caused to whirl with said gaseous medium. A portion of the gaseous medium in this outer zone with the suspended material carried thereby, is continually withdrawn through flue 141 and is forced by the recirculating fan 142, through flue 144, back into the peripheral portion of said outer zone, and serves to maintain active whirling movement of the entire body of gaseous medium in said zone, due to the high tangential component of velocity of reintroduction thereof. It will be observed that the gas withdrawn from the desiccating chamber through flue 141, as well as through flue 146, is removed from the outlet chamber 6, which is of somewhat less diameter than the main desiccating chamber, so that the gas reintroduced through flue 144, as well as all other gas entering the outer portion of the desiccating chamber and forming a part of the whirling outer zone, is caused to pass inwardly to a point adjacent or somewhat inwardly of the periphery of outlet chamber 6, which serves to positively maintain an outer whirling zone of definite and quite appreciable thickness, and the total amount of gas continually whirling in this outer zone may be several times as large as the amount of gas actually handled by the recirculating fan. It may be seen, therefore, that the function of the recirculating system is to continually supply sufficient energy of rotation to the relatively large body of whirling gas in the outer zone by continually removing and reintroducing thereto a relatively small portion of such gas at high velocity, rather than to attempt to continually withdraw and reintroduce the entire volume of this relatively large body of gas. With such an arrangement, it is essential that the outflow of gas from this whirling zone be provided at a point somewhat inwardly from the periphery thereof, as through the outlet chamber 6, in order to positively maintain the desired thickness of said zone.

Figure 17:
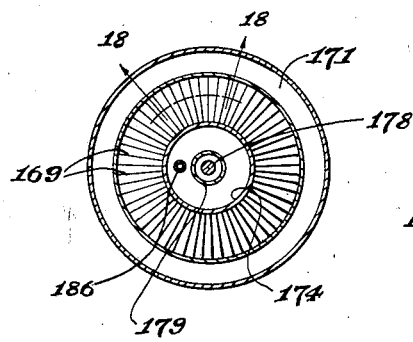
Fig. 17 is a horizontal section on line 17—17 in Fig. 16.
Figure 18:
Fig. 18 is a fragmentary sectional view on line 18—18 in Fig. 17.

The suspended material is thus repeatedly carried around with the whirling gas in the outer zone and in the recirculating system for a sufficient length of time to complete the desired desiccation thereof by contact with the relatively low temperature gas in said zone. A portion of the gas and suspended particles from said outer zone is also continually discharged through outlet chamber 6 and discharge outlet flue 146, whence it is delivered by fan 147 and flue 149 to suitable apparatus, not shown, for separating the desiccated suspended material from the gas. Such separating apparatus may consist, for example, of bag filter apparatus or of mechanical separating apparatus of the cyclone type.

It will be seen that, in order for the suspended particles which have been thrown outwardly into the outer zone to reach the outlet conduit 146, such particles must again move inwardly against the centrifugal force acting thereon. As the particles in the outer zone become lighter, due to decrease in moisture content thereof, they tend to be carried inwardly by the gas due to progressive inward movement of the gas in the outer zone, from the tangential inlet flue 144 to the periphery of outlet chamber 6, and are caused to enter said outlet chamber only when their weight is decreased in this manner to such a point that the gas is able to carry them inwardly against centrifugal force. For this reason, the suspended particles are caused to be retained in the treating chamber until the desired treatment thereof is completed.

Any suspended material which may settle upon the bottom wall 5 of the desiccating chamber or which may lodge upon the side wall 2 thereof is continually loosened from said walls by the rotating cleaning chains 115, and either becomes re-suspended in the whirling gas or passes toward the periphery of the bottom of said chamber, whence it is withdrawn, together with a relatively small proportion of gas through flue 151 and delivered by fan 153 and flue 155 into the discharge outlet flue 146, where it is picked up by the main body of gas passing through said last-mentioned flue and is conveyed thereby to the separating apparatus.

During the above described operation, relatively cool gas is also introduced into the chamber adjacent the positions of introduction of the hot gaseous drying medium. If the hot gas introduced through the upper and lower conduits 61 and 63 were permitted to directly contact the atomizer, the exposed surfaces of said atomizer would become heated, and if particles of suspended non-gaseous material were permitted to come in contact with these surfaces, such material would tend to stick to said surfaces or to be injured by such contact. These difficulties are prevented, however, in the following manner: The operation of fan 147 serves to maintain a somewhat reduced pressure within the drying chamber, so that atmospheric air at a materially lower temperature than the hot gaseous drying medium is continually drawn in through the tubular members 41 and 86. This relatively cool air impinges directly upon the bottom and top respectively of the atomizer 11 and shields said atomizer at both sides from direct contact of the hot gaseous drying medium therewith. Furthermore the outward flow of the hot gaseous drying medium both above and below the atomizer effectively prevents any of the suspended particles of non-gaseous material from moving toward and coming in contact with the exposed surfaces of the atomizer after such material has been discharged from said atomizer, and this action is also enhanced by the outward movement of the relatively cool air admitted as above described within the opposed annular streams of hot gaseous drying medium, this relatively cool air being also caused to pass outwardly below and above the atomizer and between said atomizer and said opposed streams of hot gaseous drying medium. Furthermore, the tubular shields 88 and 111 around the respective hot gas inlet conduits 61 and 63 prevent the suspended particles of non-gaseous material from coming in contact with the heated walls of said conduits, and said tubular shield members are prevented from becoming overheated due to the continual inflow of relatively cool atmospheric air through the annular passages 89 and 112''. Furthermore, the air admitted through these last-mentioned passages provides an outward flow of gas from a position around the inner ends of the hot gas inlet conduits and thus prevents the suspended particles of non-gaseous material from coming in contact with the inner ends of said conduits.

Referring to the form of apparatus shown in Figs. 13 to 18 inclusive, a treating chamber is indicated at 160, said chamber being of substantially circular horizontal cross-section, for example, a cylindrical vessel having a substantially vertical axis, and being provided with top and bottom walls 161 and 162 respectively. This particular apparatus is intended especially for the drying or desiccation of divided non-gaseous materials, and for this purpose means are shown for supplying a hot gaseous medium to the chamber 160 adjacent the axis thereof, such means comprising a furnace 163 of any suitable type and fired with any suitable form of fuel, a flue or conduit 164 for conducting hot combustion gases therefrom, a branched distribution conduit 165 connected to flue 164 and extending over the top wall 161 adjacent the central portion thereof, a distribution chamber 166 formed between the top wall 161 and a frusto-conical partition 167 and communicating with the conduit 165 by means of a suitably shaped opening 168 in said top wall, and helically inclined vanes 169 located in an annular opening 171 leading from the distribution chamber 166 into the interior of chamber 160. The vanes 169 extend substantially radially as shown in Fig. 17, and are preferably inclined downwardly in one direction circumferentially, as shown in Fig. 18, so as to provide inclined passages 172 therebetween, through which the gaseous medium is introduced downwardly and with a whirling or vortical motion into the chamber 160. However, said vanes may, if desired, be omitted, so that the gaseous medium will be delivered through annular opening 171 substantially in an axial direction, in which case the rotation of the atomizer and of the material delivered therefrom are relied upon to impart whirling motion to such gaseous medium.

A cylindrical or other suitably shaped conduit 174 extends centrally through the distributing chamber 166, communicating at its upper end with an opening 175 in the top wall 161 and having an opening 176 at its lower end leading into the chamber 160. Suitable means are provided for introducing non-gaseous material to be desiccated through the conduit 174 and for delivering the same outwardly in atomized or divided condition into the whirling gaseous medium delivered into the treating chamber as above described. Such means are shown as comprising a centrifugal atomizer 177 of any suitable type mounted at the lower end of a shaft 178 which extends through and is rotatably supported on an inner housing 179, and which is provided at its upper end with suitable driving means such as pulley 181 mounted on said shaft. Said pulley may be driven at suitable speed for effecting the desired atomization, by means of an electric motor 182 operatively connected thereto by means of pulley 183 and belt 184. The housing 179 together with the shaft 178 and atomizer 177 may be supported by means of a plate 185 secured upon the top wall 161 or to any other suitable fixed supporting means. The material to be desiccated may be delivered to the atomizing device 177 in any suitable manner, for example, by means of a pipe 186 extending through plate 185 and between the housings 174 and 179 and communicating at its lower end with the interior of said atomizing device, for example, through the enlarged fixed housing portion 187. The centrifugal atomizer 177 may, for example, be of the type shown and described in the patent application of David D. Peebles and Arthur E. Barlow, Ser. No. 527,730, filed April 4, 1931, but it will be understood that the present invention is not restricted to the use of any particular type of atomizer.

It will be evident that the introduction of hot gaseous medium through distributing chamber 166 and through the annular opening 171 will cause the adjacent walls or surfaces, such as partition 167 and conduit 174, as well as the vanes 169, to tend to become heated to a relatively high temperature, and means are therefore shown for introducing relatively cool air or other gaseous medium adjacent these walls or surfaces, so as to reduce the heating of certain of these surfaces and also prevent the non-gaseous particles within the treating chamber from coming in contact therewith. For this purpose the plate 185 may be mounted in such manner as to be spaced somewhat above the top wall 161, for example, by means of washers or spacers 188, so as to provide a space 189 establishing communication between the outside air and the interior of conduit 174, thus permitting air at relatively low temperature to be drawn in through this space and through the conduit 174 and opening 176. Furthermore, additional air or other gas at relatively low temperature may be admitted through an annular passage 191 between partition 167 and an auxiliary partition 192, said annular passage communicating at its upper end with the surrounding atmosphere (or other gas source) as by means of pipes 193 and opening into the chamber 160 at its lower end through an annular opening 193 which directly surrounds the opening 171. Means such as dampers 194 may be provided for controlling the inflow of air through the passage 191. In case the introduction of air through conduit 174 and through passage 191 would be objectionable, the upper ends thereof may be closed off from the atmosphere and may be connected by suitable piping to any suitable means for supplying a relatively cool gas of the desired nature.

For effecting circulation of gaseous medium in the outer portion of the treating chamber there is shown a flue or conduit 195 communicating with said chamber at a position somewhat inwardly from the periphery thereof, said flue preferably opening through the bottom wall of the chamber, as at 196, and extending downwardly in an inclined direction, substantially tangentially with respect to a circumferential line at the position of said opening. Said flue leads to the inlet side of a fan or blower 197 whose outlet is connected to flue or conduit 198 which opens substantially tangentially through the side wall of the chamber 160, as at 199, in a reverse direction to the flue 195, so that recirculation of gaseous medium through said flues and fan tends to set up a whirling or vortical motion of the gas in the outer portion of the chamber 160, preferably in a direction opposite to that of the gas delivered to the central portion of the chamber through the vanes 169. As shown in the drawings, for example, the vanes 169 are so disposed as to cause the hot gaseous medium delivered therethrough to whirl in a clockwise direction as indicated by the arrow at 201 in Fig. 14, while flues 195 and 198 are so connected as to cause whirling motion in the outer zone in a counter-clockwise direction, as indicated by the arrow at 202 in said figure. The flue 198 is shown as connected to the chamber at a level adjacent or just below the position of the centrifugal atomizer 177, but it will be understood that the invention is not restricted to the location of this flue in this exact position.

The means for removing from the treating chamber a portion of the gaseous medium together with the treated non-gaseous material suspended therein, is shown as comprising a conduit 204 opening substantially tangentially through the side wall of chamber 160 in the same direction as the flue 195, preferably substantially diametrically opposite said flue 195, and at any suitable height, for example, adjacent the lower end of said chamber, a fan or blower 205 having its inlet connected to said flue, and a flue 206 connected to the outlet of said fan or blower and adapted to deliver such gaseous medium to any suitable collecting means for separating or collecting the treated non-gaseous material from such gaseous medium. Such collecting means may be of any suitable type adapted for the collection of the particular material produced in the operation of the apparatus. For example, if such material consists of a finely divided dry solid product, such apparatus may consist of cyclone separating apparatus, bag filters, or settling chambers.

Means are also shown for removing from the side and bottom walls of chamber 160 any solid materials which may tend to deposit or accumulate thereon during the operation of the apparatus, such means comprising flexible scraping members such as chains 207 connected at 208 and 209 to a supporting framework 211 which is rotatably supported for movement about the axis of the chamber 160. In Fig. 13 said framework is shown as mounted upon a shaft 212 rotatably mounted in bearing means 213 and 214 and driven by means of suitable mechanism, such as gears 215.

The desiccation of non-gaseous material in accordance with this invention may be carried out in the above described apparatus as follows: Hot gaseous drying medium is continually delivered through the inclined vanes 169 into the upper central portion of the chamber 160 and adjacent the centrifugal atomizer 177, whereby such gas is caused to swirl or move about in an inner zone in the general direction indicated at 201 and to also pass downwardly in such zone. At the same time, a certain amount of gaseous medium is continually withdrawn from said chamber through conduit 204, the amount of gas so withdrawn including a quantity of the gaseous drying medium at a relatively low temperature and augmented by a quantity of water vapor or other vapor liberated from the non-gaseous material as hereinafter described. Furthermore, a certain portion of the gaseous medium is continually caused to recirculate in an outer zone, in the direction indicated at 202, by the action of fan 197 which continually withdraws gas through conduit 195 and delivers the same through conduit 198 back into the chamber with a tangential component of direction and adjacent the periphery thereof. Thus a compound movement of the gaseous medium is maintained, that is, nested zones of gas are formed in which the gas is preferably caused to swirl in opposite directions. The relatively high velocity of swirling movement of the gaseous medium in the outer zone, together with the continual introduction of hot gas into the inner zone, causes these zones to remain fairly well defined, and the fact that the recirculating gas is removed at a point somewhat inwardly from the periphery of the chamber causes an outer zone of substantially definite thickness to be maintained. Furthermore, since gas is continually introduced into the inner zone and continually withdrawn from the outer zone, it is evident that gas must continually pass from the inner zone to the outer swirling zone, and that in so doing the gas must gradually lose its velocity of swirling in the direction of the inner zone and then gradually acquire a velocity of swirling in the opposite direction, so that in certain portions of the chamber there may be regions of relatively little swirling movement. However, the gas moves fairly rapidly through such regions and enters the outer swirling zone, and the absence, or substantial absence, of settling of non-gaseous material within the chamber gives evidence that the movement of the gaseous medium, throughout the entire chamber, is sufficiently active to prevent such settling from taking place to any large extent. As before, the capacity of the recirculating fan 197 and its associated flues may be relatively small as compared to the amount of gas to be maintained in swirling movement in the outer zone, the relatively small amount of gas passing through the fan being reintroduced into the chamber at sufficiently high tangential velocity to keep the entire outer zone whirling.

The velocity of recirculation of gas through the recirculating system above described may be regulated by varying the speed of operation of fan 197, or if desired, suitable damper means may be provided in flue 195 or 198 for this purpose, it being understood that the required or optimum velocity of recirculation may vary with different materials, depending on the rate of drying thereof, the size of the particles, the tendency of the material to stick, the specific gravity thereof, and other properties.

The material to be desiccated consisting, for example, of milk or a milk product such as whey, is also delivered to the process continually, being introduced through pipe 186 and housing 187 to the centrifugal atomizing device 177, by which it is thrown outwardly by centrifugal force, in atomized or finely divided condition, directly into the downwardly swirling hot drying gas in the inner zone. This hot gas quickly heats the particles sufficiently, to cause rapid evaporation of liquid therefrom. The centrifugal atomizer is preferably rotated in the desired direction of swirling movement of the gas in the inner zone, for example, clockwise in the present case, and thus tends to induce or increase the swirling movement of the gas in such zone and directly surrounding the atomizer. The atomized particles of material are carried along with the whirling gas and the centrifugal force thus created on said particles causes the same to continue their outward movement and to pass outwardly through the inner zone of high temperature gas. While in this zone the small size of the particles and the movement of the gas and particles relative to one another both serve not only to effect a rapid transfer of heat from the gas to the particles, but also to promote escape of vapors therefrom.

The centrifugal force then causes the particles to progress outwardly through the region of transition between the two swirling zones and into the outer zone, and in this movement, the particles are decelerated in one direction and then accelerated in the other direction, and are thus subjected to considerable agitation and the outward progress thereof is somewhat arrested. As the particles take up the direction of the swirling gas in the outer zone they are again subjected to centrifugal force which prevents reentry of the particles into the high temperature gas.

It may be pointed out here that by the time the gas reaches the outer zone it has been cooled to a relatively low temperature, by utilization of its heat in heating the particles and in evaporating liquid therefrom, so that it is no longer hot enough to injure the material being treated. The atomized particles are, therefore, initially brought into contact with a gas at a relatively high temperature which, in the case of milk or other heat-sensitive organic materials, would be sufficient to injure the dried material, but the particles are maintained in contact with this high temperature gas for only a limited period of time, and only during the time when their liquid content is sufficiently high to prevent burning or injury thereof. By the time the particles are heated and partially dried to such an extent that contact with such high temperature might be injurious they have passed out of this high temperature zone and into the outer zone of relatively lower temperature. Furthermore, since the particles are subjected substantially continually to the action of centrifugal force, they are prevented from subsequently reentering the high temperature zone.

While the gas in the outer zone is at a relatively low temperature as compared to the inner zone, it is still warm enough and of sufficiently low humidity to effect further evaporation of liquid from the suspended particles, and an important feature of this invention is that the particles are caused to remain in suspension in this outer zone and to swirl about with the gas therein for a sufficient period of time to complete the desiccation thereof. Some of the suspended particles are, of course, carried along with the gas recirculated through conduits 195 and 198 and back into the chamber. An important function of the recirculation is to maintain a high velocity of swirling movement of gas in the outer zone and to increase the time during which the particles are kept therein.

A portion of the gaseous medium containing desiccated particles in suspension therein is also continually withdrawn from the chamber 160 through conduit 204 by the action of fan 205. Since this portion of the gaseous medium is removed from the outer zone it is evident that the particles removed therewith will have been subjected to the action both of the high temperature gas in the inner zone and also of the relatively low temperature gas in the outer zone, and the rate of flow of gas through the apparatus is so regulated, in proportion to the rate of feed of non-gaseous material thereto, that the particles so removed will have been dried or desiccated to the desired extent. In the apparatus shown in the drawings the rate of flow of gas through the apparatus is determined by the operation of fan 205, but it will be understood that any other suitable means may be used for controlling such rate of flow. From the fan 205 the gas and desiccated particles removed from the desiccating chamber are delivered through conduit 206 to any suitable means for separating the desiccated particles from the gas and collecting the same. In the case of dried milk or whey, such separating and collecting means may consist for example of cyclone separating apparatus or bag filters or both.

In the above-described operation it will be seen that the introduction of hot gaseous drying medium through the distributing chamber 166 and annular passage 171 will cause the conduit 174 and the partition 167 to become heated to such an extent that if the suspended particles of milk or whey or other organic material, or the dried or partially dried product thereof, were permitted to come into contact with these heated surfaces, such materials would be burned, discolored or otherwise injured. Furthermore, if the incoming hot drying medium were permitted to directly contact the means for introducing the material to be dried, including the housing means 187 and atomizer 177, so as to heat these parts, and the suspended particles were permitted to come into contact therewith, similar injury would result. However, since the fan 205 operates to always maintain a certain reduced pressure within the chamber 160, a current of relatively cool air from the surrounding atmosphere, or other cool gaseous medium if necessary, is continually drawn in through the space 189 and through the annular space between conduit 174 and housing 179, and enters the chamber 160 through the opening 176 at the lower end of said conduit, thus serving not only to cool the walls of said conduit and the housing 187 and atomizer 177, but also to maintain sufficient pressure below the opening 176 to prevent formation of eddy currents and to force the suspended particles away from, instead of toward the above-mentioned parts. Furthermore, said incoming relatively cool air may in some cases serve to maintain the feed pipe 186 at a relatively low temperature so as to prevent undue localized heating of the material to be desiccated before it is delivered in atomized condition into the desiccating chamber. Similarly, a current of relatively cool air from the surrounding atmosphere, or other cool gaseous medium if necessary, is drawn in through the annular passage 191 between the partitions 167 and 192 and is delivered through opening 193 into the chamber 160 just outside the incoming current of hot drying gas, and serves to cool the partition 192 and maintain a sufficient pressure below the opening 193 to prevent creation of eddy currents and to cause suspended particles to be continually forced away from rather than toward said partition. It will be understood that the amounts of cold air or other gas drawn in as above described are relatively small as compared to the inflow of hot drying gas, so that they do not materially reduce the temperature and drying efficiency thereof, as it has been found that the introduction of relatively cool gas at these points, even in relatively small amounts, is decidedly advantageous in connection with the desiccation or treatment of organic materials such as milk or whey. The amount of air drawn in through the annular passage 192 may be controlled by adjustment of dampers 194. In the construction shown, the amount of air drawn in through the conduit 174 is restricted by the relatively narrow space 189 between the plate 185 and the top wall 161 of the chamber, but it will be understood that suitable means may be provided, if desired, for adjustably controlling the inflow of air at this point also.

Any suitable means may be provided for furnishing the supply of hot gaseous medium for use in either of the forms of desiccating apparatus above described. For example, instead of using the hot combustion gases from a furnace as above described, it will be understood that such gases may be passed through a suitable heat interchanger and utilized to heat a stream of air or any other suitable drying gas.

I claim:

1. The method of treating non-gaseous materials in suspension in a gaseous medium which comprises maintaining a body of gaseous medium in a chamber, introducing non-gaseous material in finely divided condition into the central portion of said body of gaseous medium, continually introducing gaseous medium into the central portion of said chamber and into contact with said non-gaseous material, continually withdrawing a portion of gaseous medium from said chamber at a position removed from the center thereof but somewhat inwardly from the periphery thereof and continually reintroducing gaseous medium so withdrawn into said chamber adjacent the periphery thereof with a tangential component of direction, so as to maintain active swirling movement in an outer zone of substantially predetermined thickness.

2. In methods of treatment of non-gaseous materials in suspension in a gaseous medium, involving the maintenance of an inner zone of gaseous medium into which non-gaseous material and gaseous treating medium are introduced, and an outer swirling zone of gaseous medium around said inner zone, the step which comprises removing gaseous medium from a position somewhat inwardly from the periphery of said outer zone and reintroducing gaseous medium so removed into said outer zone with a tangential component of direction, so as to maintain the swirling movement and establish an outer zone of substantially predetermined thickness.

3. The method of treating non-gaseous materials in suspension in a gaseous medium which comprises maintaining a flow of gaseous treating medium through a chamber by continually introducing such gaseous medium into said chamber adjacent the central portion thereof and continually removing gaseous medium from said chamber at a position removed from the position of introduction thereof, introducing non-gaseous material in finely divided condition into said gaseous medium within said chamber, and maintaining swirling movement in the outer portion of said chamber by continually withdrawing a limited portion of gaseous medium from said chamber at a position removed from the center of said chamber but somewhat inwardly from the periphery thereof and reintroducing gaseous medium so withdrawn into the outer portion of said chamber with a tangential component of direction, so as to maintain active swirling movement substantially throughout the annular zone between the point of withdrawal of such gaseous medium and the periphery of the chamber, the quantity of gaseous medium thus withdrawn and reintroduced being relatively small as compared to the quantity of gas thus caused to swirl in said annular zone.

4. In methods of treatment of non-gaseous materials in suspension in a gaseous medium involving introduction of gaseous medium and divided non-gaseous material into the central portion of an enclosed chamber and recirculation of gaseous medium in an annular zone adjacent the periphery of said chamber, the steps which comprise continuously removing a portion of gaseous medium from said chamber at a position removed from the center of the chamber but somewhat inwardly from the periphery thereof, imparting energy to such removed gaseous medium outside said chamber so as to increase the velocity thereof, and reintroducing such gaseous medium into said annular zone with a tangential component of direction and at sufficient velocity to maintain active swirling movement of substantially the entire body of gaseous medium in said zone, the quantity of gaseous medium thus removed and reintroduced being relatively small as compared to the total quantity of gaseous medium maintained in swirling movement thereby.

5. The method of treating non-gaseous materials in suspension in a gaseous medium which comprises maintaining a body of gaseous medium in a chamber of substantially circular cross-section, introducing non-gaseous material in divided condition into said gaseous medium adjacent the central portion of said chamber, causing material so introduced to move outwardly through the gaseous medium in said chamber, continuously withdrawing a portion of gaseous medium containing suspended non-gaseous material from said chamber at a position somewhat inwardly from the periphery thereof, and continually reintroducing gaseous medium and suspended material so withdrawn into the outer portion of said chamber with a tangential component of direction, so as to maintain active swirling movement of the gaseous medium in said outer portion of the chamber.

6. The method of treating non-gaseous materials in suspension in a gaseous medium, which comprises introducing non-gaseous material in divided condition into a chamber adjacent the central portion thereof and causing the material so introduced to move outwardly in said chamber, introducing gaseous medium into said chamber adjacent the point of introduction of such non-gaseous material, continually withdrawing a portion of gaseous medium from said chamber at a position somewhat inwardly from the periphery thereof, reintroducing gaseous medium so withdrawn into the outer portion of said chamber with a tangential component of direction, so as to maintain active swirling movement of the gaseous medium in said outer zone, and continually removing another portion of gaseous medium from said chamber and separating suspended non-gaseous material from said last-named portion.

7. The method of treating non-gaseous materials in suspension in a gaseous medium, which comprises introducing gaseous medium into a chamber adjacent the central portion thereof, introducing non-gaseous material in divided condition into contact with said gaseous medium adjacent the central portion of said chamber, causing such gaseous medium and non-gaseous material to move outwardly toward the periphery of said chamber, continually withdrawing gaseous medium and suspended non-gaseous material from said chamber at a position somewhat inwardly from the periphery thereof, subjecting a portion of the removed gaseous medium and non-gaseous materials to a separating operation to recover treated non-gaseous material therefrom, and reintroducing another portion of said removed gaseous medium and non-gaseous material into the outer portion of said chamber with a tangential component of direction, so as to maintain active swirling movement therein.

8. The method of treating non-gaseous materials in suspension in a gaseous medium which comprises introducing non-gaseous material in finely divided condition into said chamber adjacent the central portion thereof and with an outward component of direction, introducing gaseous medium at relatively high temperature into said chamber, with an axial component of direction, in such position as to contact said non-gaseous material substantially immediately upon introduction of said material into said chamber, causing said gaseous medium and non-gaseous material to move outwardly into an outer zone of relatively low temperature, and maintaining active swirling movement of the gaseous medium in said outer zone by continually withdrawing a portion of gaseous medium from said chamber at a position somewhat inwardly from the periphery thereof, and reintroducing gaseous medium so withdrawn into the outer portion of said chamber with a tangential component of direction.

9. The method of treating non-gaseous materials in suspension in a gaseous medium which comprises introducing non-gaseous material in finely divided condition into said chamber adjacent the central portion thereof, said material being delivered outwardly with a high velocity whirling movement, introducing gaseous medium into a position adjacent the point of introduction of said non-gaseous material and causing said gaseous medium to whirl by the action of whirling non-gaseous material thereon, moving said gaseous medium and suspended non-gaseous material outwardly into an outer zone within said chamber, continually withdrawing a portion of gaseous medium from said chamber at a position somewhat inwardly from the periphery thereof and reintroducing gaseous medium so withdrawn into the outer portion of said chamber with a tangential component and in such direction as to cause active swirling movement of the gaseous medium in said outer zone in a direction opposite to the direction of original whirling movement of the introduced non-gaseous material.

10. The method of treating non-gaseous materials in suspension in a gaseous medium which comprises introducing non-gaseous material in finely divided condition into a chamber adjacent the central portion thereof, with an outward component of direction, introducing gaseous medium into contact with the non-gaseous material so introduced, from both sides of such material and with an axial component of direction, causing the mingled non-gaseous material and gaseous medium to move outwardly toward the outer portion of said chamber, and maintaining active swirling movement of the gaseous medium in the outer portion of said chamber by continually withdrawing a portion of gaseous medium therefrom and continually reintroducing the same into said outer portion with a tangential component of direction.

11. The method of treating non-gaseous materials in suspension in a gaseous medium which comprises introducing non-gaseous material in finely divided condition into a chamber adjacent the central portion thereof, with a high velocity whirling movement, and causing such material to move outwardly by the action of centrifugal force, introducing gaseous medium with an axial component of motion at both sides of said non-gaseous material, so as to cause said gaseous medium to mingle with said non-gaseous material and move outwardly therewith and to whirl in the same direction as said non-gaseous material, continually withdrawing a portion of gaseous medium from said chamber and reintroducing the same into the outer portion of said chamber with a tangential component and in such direction as to cause active swirling movement of the gaseous medium in said outer portion in a direction opposite to the direction of original whirling movement of the introduced non-gaseous material.

12. The method of treating non-gaseous materials in suspension in a gaseous medium which comprises introducing gaseous medium into a chamber adjacent the central portion thereof, introducing finely divided non-gaseous material into said gaseous medium within the chamber adjacent the central portion thereof, continually withdrawing gaseous medium and suspended non-gaseous material from said chamber at a position somewhat inwardly from the periphery thereof, reintroducing a portion of such gaseous medium and suspended material into said chamber with a tangential component of direction, so as to maintain active swirling movement within said chamber, subjecting another portion of the withdrawn gaseous medium and suspended material to a separating operation to separate the suspended material from the gaseous medium, continually removing a relatively small portion of gaseous medium and non-gaseous material from adjacent the periphery of said chamber, and delivering said last-named portion into said other portion of the first-named withdrawn gaseous medium and suspended material prior to said separating operation.

13. A method of treating non-gaseous materials in suspension in a gaseous medium which comprises introducing finely divided non-gaseous material and gaseous medium into a chamber adjacent the central portion thereof and causing said material and medium to move outwardly into the outer portion of said chamber, continually withdrawing a portion of gaseous medium from said chamber at a position somewhat inwardly from the periphery thereof and reintroducing gaseous medium so withdrawn into the outer portion of said chamber with a tangential component of direction, and separately removing a relatively small portion of gaseous medium and non-gaseous material from the lower portion of said chamber at a position adjacent the periphery thereof.

14. An apparatus for treatment of non-gaseous materials in suspension in a gaseous medium comprising a chamber of substantially circular cross-section, atomizer means disposed substantially centrally in said chamber and adapted to deliver finely divided non-gaseous material, gaseous medium supply means opening into said chamber adjacent the position of delivery of material from said atomizer means, and gaseous medium recirculation means comprising an outlet flue communicating with said chamber at a position removed from the position of said gaseous medium supply means but somewhat inwardly from the periphery of said chamber, gas propelling means, and an inlet flue communicating substantially tangentially with the outer portion of said chamber.

15. An apparatus for treatment of non-gaseous materials in suspension in a gaseous medium comprising a chamber of substantially circular cross-section, atomizer means disposed substantially centrally within said chamber and adapted to deliver finely divided non-gaseous material, gaseous medium supply means opening into said chamber adjacent the position of delivery of material from said atomizer means, and gaseous medium recirculation means comprising an outlet flue communicating with said chamber at a position removed from the position of said gaseous medium supply means but spaced somewhat inwardly from the periphery of said chamber, gas propelling means, and an inlet flue communicating substantially tangentially with the outer portion of said chamber, said recirculation means being of relatively small capacity as compared to the total volume of gaseous medium in the annular zone between said outlet flue and the periphery of the chamber.

16. An apparatus for treatment of non-gaseous materials in suspension in a gaseous medium comprising a treatment chamber of substantially circular cross-section, gaseous medium supply means communicating with the central portion of said chamber, atomizing means disposed in the central portion of said chamber, an outlet chamber of considerably smaller diameter than said treatment chamber communicating with said treatment chamber, said outlet chamber being disposed at one end of said treatment chamber and substantially concentric therewith, means for introducing finely divided non-gaseous material and gaseous medium into said treatment chamber, means for withdrawing gas from said outlet chamber, and means for reintroducing gas so withdrawn substantially tangentially into the outer portion of the treatment chamber.

17. An apparatus for treatment of non-gaseous materials in suspension in a gaseous medium comprising a treatment chamber of substantially circular cross-section, gaseous medium supply means communicating with the central portion of said chamber, atomizer means disposed in the central portion of said chamber, an outlet chamber of considerably smaller diameter than said treatment chamber and communicating therewith, said outlet chamber being disposed at one end of said treatment chamber and substantially concentric therewith, means for introducing finely divided non-gaseous material and gaseous medium into said treatment chamber, means for withdrawing gas from said outlet chamber, means for reintroducing gas so withdrawn substantially tangentially into the outer portion of the treatment chamber, and additional means for withdrawing another portion of gas from said outlet chamber and separating non-gaseous material therefrom.

18. An apparatus for treatment of non-gaseous material in suspension in a gaseous medium comprising a chamber of substantially circular cross-section, atomizer means disposed substantially centrally within said chamber, two separate conduit means extending through the top and bottom respectively of said chamber and opening in a substantially axial direction into said chamber at positions respectively above and below said atomizer means, means for supplying gaseous medium at relatively high temperature through said conduit means, two annular shield means surrounding and spaced from the respective conduit means, and means for introducing relatively cool gas through the space between each shield means and the corresponding conduit means, said spaces opening into said chamber adjacent the inner ends of said conduit means.

19. In an apparatus for treatment of non-gaseous material in suspension in a gaseous medium, a chamber having top and bottom walls and substantially circular side walls, an atomizer drive spindle rotatably mounted axially of said chamber and extending through said bottom wall and provided at its upper end with a centrifugal atomizing device, a gas inlet conduit extending through the bottom wall of said chamber and around said drive spindle and opening upwardly into said chamber, annular bearing means disposed around said conduit and adjacent the bottom wall of said chamber, annular carriage means rotatably mounted on said bearing means, scraping elements carried by said carriage means and adapted to engage the side and bottom walls of said chamber upon rotation of said carriage means, driving means extending through the bottom wall of said chamber at one side of said atomizer drive spindle outside said conduit and operatively engaging said carriage means, and means outside said chamber operatively connected to said drive spindle and driving means to drive the same.

20. An apparatus for treatment of non-gaseous materials in suspension in a gaseous medium comprising a substantially cylindrical chamber; atomizer means in the central portion of said chamber and adapted to deliver finely divided non-gaseous material outwardly therefrom; gaseous medium supply means opening into said chamber adjacent the position of delivery of material from said atomizer means; and gaseous medium recirculation means comprising an outlet flue communicating with said chamber through one end thereof and at a position removed from the point of supply of said gaseous medium but somewhat inwardly from the periphery of said chamber, gas propelling means, and an inlet flue communicating substantially tangentially with the outer portion of said chamber.

21. An apparatus for treatment of non-gaseous material in suspension in a gaseous medium at relatively high temperature comprising a chamber of substantially circular cross-section, atomizer means in the central portion of said chamber and adapted to deliver finely divided non-gaseous material outwardly therefrom, two separate conduit means extending respectively through the opposite ends of said chamber and opening into said chamber in a substantially axial direction at positions respectively above and below said atomizer means, means for supplying gaseous medium at relatively high temperature through both of said conduit means, said conduit means being so disposed as to direct said high temperature gaseous medium into intimate contact with the non-gaseous material delivered by said atomizer means, two tubular members extending substantially concentrically within the respective conduit means and opening into said chamber in a substantially axial direction in proximity to said atomizer means and respectively above and below the same, means for introducing gaseous medium at a materially lower temperature than said first-named gaseous medium through both of said tubular members, said tubular members being so disposed as to direct said second-named gaseous medium into contact with said atomizer means in such manner as to shield said atomizer means at both sides from said high temperature gaseous medium, means for maintaining swirling movement of gaseous medium and suspended material in the outer portion of said chamber, and means for removing gaseous medium and non-gaseous material from said chamber.

22. An apparatus for treating non-gaseous material in suspension in a gaseous medium comprising a chamber of substantially circular cross-section; atomizer means in the central portion of said chamber and adapted to deliver finely divided non-gaseous material outwardly therefrom; gaseous medium supply means opening into said chamber adjacent the position of delivery of non-gaseous material from said atomizer means; gaseous medium recirculation means comprising an outlet flue communicating with said chamber at a position removed from said gaseous medium supply means but somewhat inwardly from the periphery of said chamber, gas propelling means, and an inlet flue communicating substantially tangentially with the outer portion of said chamber; a conduit communicating with said chamber at a position adjacent the periphery thereof, and means for withdrawing gaseous medium and non-gaseous material from said chamber through said conduit.

23. An apparatus as set forth in claim 22, said outlet flue of the recirculation means communicating with said chamber at the upper end thereof, and said conduit communicating with said chamber at the lower end thereof.

DAVID D. PEEBLES.